Patented July 25, 1933

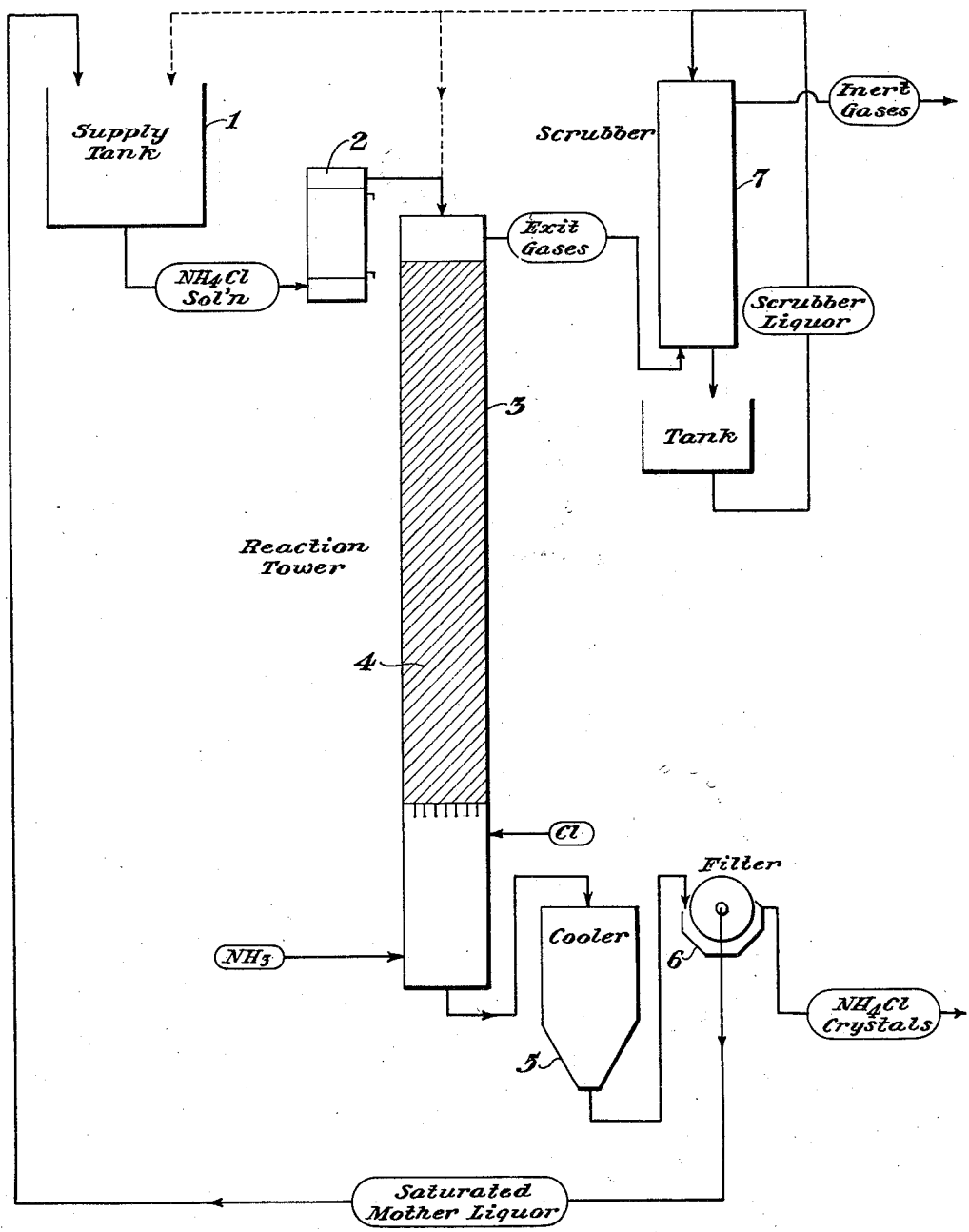

1,919,943

UNITED STATES PATENT OFFICE

SHELDON B. HEATH AND HANS A. REIMERS, OF MIDLAND, MICHIGAN, ASSIGNORS TO THE DOW CHEMICAL COMPANY, OF MIDLAND, MICHIGAN, A CORPORATION OF MICHIGAN

PROCESS OF MAKING AMMONIUM CHLORIDE

Application filed June 30, 1932. Serial No. 620,204.

The present invention relates to processes for making ammonium chloride, and particularly to a process involving the interaction of ammonia and chlorine in accordance with the equation:—

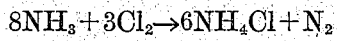

$$8NH_3 + 3Cl_2 \rightarrow 6NH_4Cl + N_2$$

In carrying out the foregoing reaction by directly combining the two gases numerous practical problems arise. The ammonium chloride product may be formed as a "fog" or mist which is extremely difficult to condense or even to absorb in water. The highly exothermic character of the reaction necessitates the provision of adequate means to absorb heat and to prevent excessive rise of temperature. It is also essential to avoid the presence of an excess of chlorine, even transiently, which would lead to the formation of the highly unstable nitrogen chloride and thereby create a dangerous explosion hazard.

Some of the aforementioned difficulties may be obviated if the reaction is carried out in the liquid phase by introducing the gases into a suitable aqueous medium, thus facilitating temperature control and repressing the tendency to fog formation. There still remains, however, the problem of accurately proportioning the reaction gases so as to avoid any material excess of either ammonia or chlorine. As already stated, an excess of the latter gives rise to formation of nitrogen chloride. An excess of ammonia, on the other hand, causes the formation of chloramines. The latter compounds, i.e. $NH_2Cl$ and $NHCl_2$, impart a pronounced yellow color to the solution and to the ammonium chloride crystals subsequently separated therefrom, which necessitates recrystallization in order to obtain a product sufficiently free from color to answer trade requirements. The avoidance of fluctuations in the rate of flow of the reaction gases, which would cause the introduction, at least temporarily, of an excess of either chlorine or ammonia, imposes a requirement which is extremely difficult of attainment on a large scale. Nevertheless, the successful application of the reaction in question to a commercial manufacturing process demands a practical solution for the last mentioned difficulty, as well as those previously referred to.

We have now found that the necessity for extreme accuracy in controlling the supplies of ammonia and chlorine may be avoided if the reaction is carried out in liquid phase at a temperature above 95° C. By so doing the formation of nitrogen chloride or chloramines is prevented, regardless of the presence of an appreciable excess of chlorine or ammonia in the reaction mixture. As a liquid medium in which to carry out the reaction an ammonium chloride solution is most advantageous, inasmuch as the mother liquor from which the crystals of the product have been separated may be recycled to furnish the aqueous medium for continuing the process.

To the accomplishment of the foregoing and related ends, the invention, then, consists in the steps hereinafter fully described and particularly pointed out in the claims, the annexed drawing and following description setting forth a preferred embodiment of the invention which illustrates, however, but one of the various ways in which the principle of the invention may be employed.

In said annexed drawing:—

The single figure represents diagrammatically an arrangement of apparatus suitable for carrying out the invention, as well as the movement of materials in the process.

By introducing chlorine and ammonia into an aqueous medium consisting of an ammonium chloride solution in which the reaction is caused to take place, the heat evolved suffices to maintain the mixture at a suitable elevated temperature above 95° C., at the same time permitting an effective temperature control, due to the heat-absorptive capacity of the solution, to prevent an excessive rise in temperature. The temperature maintained for the reaction may be between 95° and 115° C., the latter being the boiling point of a saturated ammonium chloride solution. When the solution becomes saturated with the product at the reaction temperature, it may be removed and cooled to a lower temperature to crystallize ammonium chloride, the crystals constituting the product being separated from the mother liquor and the latter being returned to the process.

The operation of our improved process may be explained in greater detail by reference to the drawing. An ammonium chloride solution from a supply tank 1 is passed through a heater 2, in which the temperature of the solution is raised to 95° C., or above, and introduced into the top of an absorber tower 3, provided with a body of packing material 4, wherein the solution flows downwardly in a distributed manner. In the lower part of the tower ammonia gas and chlorine are introduced, which are absorbed or dissolved in the solution, while simultaneously reaction occurs with formation of ammonium chloride. The proportions of ammonia and chlorine should be held as closely as practicable to the theoretical proportions according to the above equation. The temperature in the reaction zone is to be maintained above 95° C. to prevent the formation of nitrogen chloride, or chloramines, if by chance an excess of chlorine or ammonia should be present at any time. In practice, the temperature at the top of the tower is maintained at 96° C. or slightly higher, whereas, due to the reaction heat evolved, the temperature of the strong solution at the bottom of the tower may be about 100° to 105° C. under usual operating conditions. For the control of the addition of chlorine and ammonia an electrometric method is most convenient, whereby an indication of hydrogen ion concentration of the solution is provided and a control in accordance therewith may be devised employing well-known methods. The hydrogen ion concentration should correspond to the value pH=7 as closely as possible to avoid waste of ammonia or chlorine.

The rate of flow of ammonium chloride liquor from supply tank 1 to tower 3 is preferably regulated, relative to the rate of introduction of chlorine and ammonia, so that the solution reaching the base of tower 3 is nearly or approximately saturated with ammonium chloride, the height of the tower being sufficient to insure completeness of reaction and absence of a material quantity of ammonia or chlorine in the exit gases. The strong hot effluent solution from tower 3 is conducted to a cooler 5 of any suitable type wherein the solution is cooled to a materially lower temperature, e. g. a temperature between 20° and 30° C. which may be accomplished by the use of natural water supplies, or by vacuum cooling, or the equivalent, without use of artificial refrigeration. Such cooling is accompanied by precipitation of ammonium chloride crystals, forming a slurry of crystals and mother liquor thereof. The crystal slurry is then filtered on a filter 6 to separate the crystals from the mother liquor, and the latter returned to supply tank 1 for reuse in the process.

The exit gases escaping from the top of tower 3, which consist chiefly of nitrogen and inert diluent gases, e. g. air, accompanying the supplies of chlorine and ammonia gas, together with water vapor and some ammonium chloride vapors, as well as at times some ammonia or chlorine, are conducted to a scrubber tower 7 wherein they are scrubbed with water to recover water soluble compounds therefrom, and then vented from the system. The scrubber liquor is recycled continuously until a sufficiently strong solution is formed, and may then be introduced into the main reaction cycle by conducting to supply tank 1 or to top of tower 3. The water introduced in this way serves to make up evaporation losses or mechanical losses occurring in the main reaction cycle so as to maintain approximately a constant volume of solution in the cycle.

The foregoing described process is preferable to that involving the reaction of ammonia and hydrochloric acid in that it provides a highly satisfactory method of employing chlorine for the reaction without the intermediate conversion of the same to hydrochloric acid. Preferably, a rich chlorine gas, e. g. 80 to 100 per cent, is employed, although a weaker gas may be used less advantageously due to somewhat greater heat requirement to maintain the desired reaction temperature. The ammonia chloride product obtained directly consists of substantially pure and white crystals which answer the tests for a C. P. material, if the apparatus employed is made of materials resistant to chemical attack, such as glass, stoneware, acid-proof brick, carbon, etc. For pipes, pumps, etc., one of the high-chromium corrosion-resistant steels is satisfactory, not being appreciably attacked under the conditions maintained as hereinbefore described.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. The process of making ammonium chloride which comprises reacting ammonia and chlorine in a medium consisting of an aqueous ammonium chloride solution at a temperature between 95° and 115° C.

2. The process of making ammonium chloride which comprises absorbing in an aqueous ammonium chloride solution ammonia and chlorine in amount corresponding to the equation;—

$$8NH_3 + 3Cl_2 \rightarrow 6NH_4Cl + N_2$$

while maintaining the temperature of the mixture between 95° and 115° C.

3. The process of making ammonium chloride which comprises absorbing in an aqueous ammonium chloride solution ammonia and chlorine in amount corresponding to the equation:—

$$8NH_3 + 3Cl_2 \rightarrow 6NH_4Cl + N_2$$

while maintaining the solution at a temperature between 95° C. and the atmospheric boiling point thereof, cooling the hot solution to crystallize ammonium chloride, separating the crystals and returning the mother liquor to the first step.

4. The process of making ammonium chloride which comprises introducing ammonia and chlorine into an aqueous ammonium chloride solution at a temperature between 95° and 115° C., while maintaining a hydrogen ion concentration of the solution corresponding closely to pH=7.

5. The process of making ammonium chloride which comprises flowing in distributed manner through a scrubber tower an aqueous ammonium chloride solution heated to a temperature above 95° C., introducing chlorine and ammonia thereinto in proportions corresponding to the equation:—

$$8NH_3 + 3Cl_2 \rightarrow 6NH_4Cl + N_2$$

regulating the rate of introduction of ammonia and chlorine relative to the flow of solution to produce a nearly saturated solution at the temperature existing, cooling the hot solution to crystallize ammonium chloride, separating the crystals and returning the mother liquor to the reaction.

SHELDON B. HEATH.
HANS A. REIMERS.